United States Patent [19]

Mc Neil

[11] Patent Number: 5,714,977
[45] Date of Patent: Feb. 3, 1998

[54] VIDEO PROCESSING SYSTEM FOR MOVEMENT SIMULATION

[75] Inventor: Ian Mc Neil, Newbury, England

[73] Assignee: Quantel Limited, Newbury, England

[21] Appl. No.: 465,969

[22] Filed: Jun. 6, 1995

Related U.S. Application Data

[63] Continuation of Ser. No. 46,479, Apr. 12, 1993, abandoned, which is a continuation of Ser. No. 410,126, Sep. 20, 1989, abandoned, which is a continuation-in-part of Ser. No. 159,780, Feb. 24, 1988, Pat. No. 4,951,040.

[30] Foreign Application Priority Data

Sep. 20, 1988 [GB] United Kingdom ............... 8822003

[51] Int. Cl.$^6$ ................................................. G09G 5/08
[52] U.S. Cl. ...................... 345/157; 345/122; 345/139
[58] Field of Search ........................ 345/139, 122, 345/138, 145, 157, 121; 395/119, 127; 348/578, 583, 590, 598; 382/276, 293, 296

[56] References Cited

U.S. PATENT DOCUMENTS

| | | | |
|---|---|---|---|
| 4,600,919 | 7/1986 | Stern | 340/747 |
| 4,667,236 | 5/1987 | Dresdner | 340/729 |
| 4,754,269 | 6/1988 | Kishi et al. | 340/729 |
| 4,831,548 | 5/1989 | Matoba et al. | 364/522 |
| 4,835,528 | 5/1989 | Flinchbaugh | 340/710 |
| 4,862,392 | 8/1989 | Steiner | 364/522 |
| 4,951,040 | 8/1990 | McNeil et al. | 340/729 |
| 4,951,232 | 8/1990 | Hannah | 340/729 |
| 4,958,147 | 9/1990 | Kanema et al. | 340/729 |
| 5,019,809 | 5/1991 | Chen | 345/157 |
| 5,107,252 | 4/1992 | Traynar et al. | 345/139 |
| 5,124,693 | 6/1992 | Himelstein et al. | 345/139 |

FOREIGN PATENT DOCUMENTS

| | | |
|---|---|---|
| 0283159 | 9/1988 | European Pat. Off. |
| 6362099 | 3/1963 | Japan. |
| 2119594 | 11/1983 | United Kingdom. |
| 2157126 | 10/1985 | United Kingdom. |
| 2158671 | 11/1985 | United Kingdom. |
| 2174861 | 11/1986 | United Kingdom. |
| 2177871 | 1/1987 | United Kingdom. |
| 8102939 | 10/1981 | WIPO. |

OTHER PUBLICATIONS

Super 3D, Silicon Beach Software, User Manual, Copyright 1988.

*Primary Examiner*—Regina D. Liang
*Attorney, Agent, or Firm*—Cooper & Dunham LLP

[57] ABSTRACT

A video processing system for use in creating apparent three dimensional movement of a two dimensional video image on a display screen 20. At least one set of axes is displayed on the image to be moved. A computer 24, in response to signals from a user operated stylus 21 and touch tablet 22, controls the manipulation of image data in an image store 26 to control apparent rotation of the image about, and/or linear movement along, an axis selected by the user. In the described embodiment several sets of linked axes are defined. Rotation or linear movement with respect to an axis is controlled respectively by selecting a marker identifying the axes or a line representing the axis. Selection is made by way of a cursor under the control of the stylus and touch tablet. The system can also display a line representing the user defined movement of e.g. the center of the image.

17 Claims, 3 Drawing Sheets

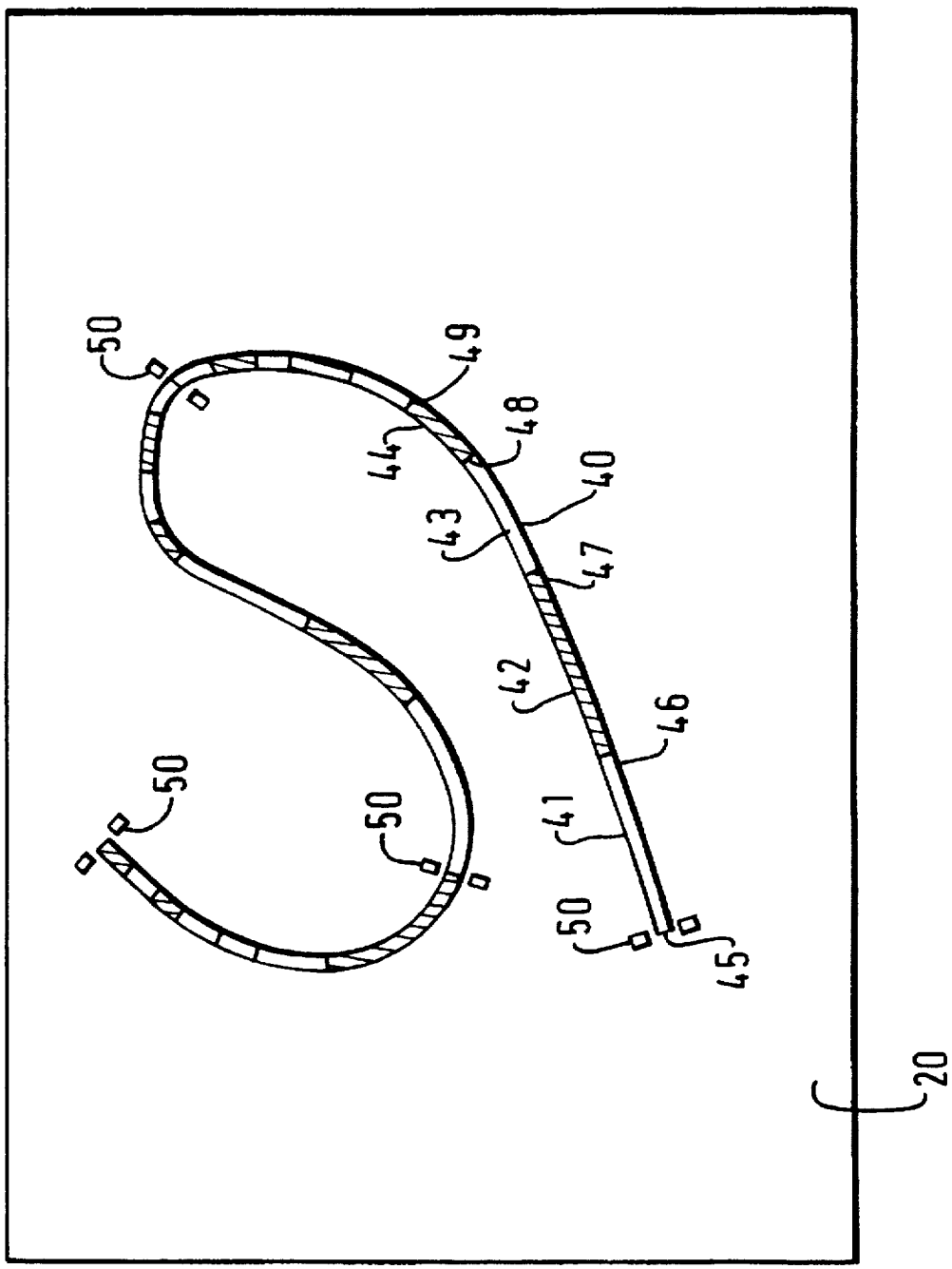

VIDEO PROCESSING SYSTEM FOR MOVEMENT SIMULATION

This is a continuation of application Ser. No. 08/046,479 filed Apr. 12, 1993 now abandoned which is a continuation of application Ser. No. 07/410,126 filed Sep. 20, 1989 (abandoned), which is a continuation-in-part of application Ser. No. 07/159,780 filed Feb. 24, 1988 (U.S. Pat. No. 4,951,040).

FIELD OF THE INVENTION

The present invention relates to a video processing system having a facility for simulating three dimensional movement of a live video picture.

BACKGROUND OF THE INVENTION

Video processing machines for simulating three dimensional movement of a live video picture are known. Hitherto, the controls for such machines have included switching devices for selecting operations and movement detectors, such as levers and tracker balls, for defining the temporal nature of the selected effect. These controls provide a means by which a user of the machine can among other things achieve the effect of apparent three dimensional movement of for example live video pictures on a display screen. However, such controls are limited in that multiple actuations of different levers and switches together with movement of the tracker ball are required in order to achieve the desired effect. Thus, efficient use of the machine requires a high level of experience and dexterity on the part of the user and, whilst highly satisfactory effects are achievable using these controls, an undue amount of time can be spent by the user in achieving desired results.

OBJECTS AND SUMMARY OF THE INVENTION

The principal object of the present invention is to provide a solution to the above and associated limitations and to provide an improved video processing system for image manipulation to simulate movement.

The invention generally resides in the concept of providing an improved video processing system in which a set of axes can be displayed over an image and the image can be manipulated by reference to said axes by a user by way of input means to realise the desired simulated movement effect.

According to the invention in one of its aspects therefore there is provided a video processing system for use in creating apparent three dimensional movement of a video image on a display screen, in which system at least one set of axes is displayed and processing means responsive to user operable input means are provided for processing image data to control apparent rotational movement of the image about, and/or apparent translational movement in the direction of, a user selected axis of said set.

In an embodiment of the invention, to be described in greater detail hereinafter, a plurality of sets of axes are available to be selectively displayed and individual axes within selected sets can be selected by the user by way of a cursor displayed on the display screen, the position of the cursor being controlled by use of the user operable input means, namely in the embodiment in question a pressure sensitive stylus and an associated touch tablet. The spatial relationship between the various sets of axes can be defined by the user by way of the cursor displayed on the display screen and manipulated by the user with his stylus and touch tablet. By providing a plurality of sets of axes and providing for selective movement in each axes set, the system provides a means by which different levels of movement of an image may be achieved as will become apparent from the following.

A first level set of axes will normally be provided at the centre of a picture, that is to say at the centre of a framed image, and the system arrangement enables the user to rotate the picture with any axis of such first set of axes or to move the picture with the origin of the axes set along the line of any axis as required. The first set of axes is normally set such that two of the axes are arranged to lie parallel to the x and y directions of the picture (and of the display screen, assuming the picture edges are parallel to the edges of the screen which will normally be the case) and a third axis is arranged to be perpendicular to the picture (and to the screen). Translation of the picture along the x and y axes, when the x and y axes of the picture are parallel to the x and y axes of the display screen, will simply cause the picture to shift left or right and up or down on the display screen, while translation along the z-axis will cause the size of the picture to change as it moves in 3D space away from or towards the display screen. The effect of rotation of the picture about an axis needs no explanation.

Higher level sets of axes are also made available to be utilised successively, and can be located by the user at any desired position in three dimensional space remote from the first axis location. The origin of the first set of axes, also called the picture level axes, (i.e. the centre of the image) is maintained at a fixed distance in three dimensional space from the origin of the second level axes and in this way rotation and translation of the picture in relation to a second level axis will cause movement of the picture in three dimensional space as though the centre of the picture were fixedly connected to one end of a rigid arm having its other end located at the origin of the second level axes and movable therewith in rotation and translation. Thus, translation and rotation of the second level axes may be effected to change the shape and size of the picture to accommodate changes in perspective and viewing position as the image is moved. Further higher levels of axes may be defined at other points in three dimensional space as required. Each level of axes will be maintained at a fixed distance from the next higher level axes and in this way complex movements of the picture through three dimensional space may be defined by the user.

As will be explained in the following, in use of the system of the invention to simulate three dimensional movement of a video picture, the first or picture level set of axes is automatically displayed at the centre of the picture when the system is activated. The user can then translate and rotate the picture level set of axes as required by use of his stylus and touch tablet. When a second level set of axes is required this is derived from the picture level set of axes which is, in effect, dragged out to the required origin position of the second set of axes, again by use of the stylus and touch tablet. The second set of axes as thus established are thus oriented identically to the orientation of the picture level set of axes at the time when the second set of axes are set up. Once the second set of axes has been set up, the user has the facility to rotate and translate in the second axes with corresponding movement of the picture. Subsequent axes sets are similarly established, each subsequent axes set being dragged out from the preceding set as above described in the case of the second and picture level set of axes. All axes sets that are set up by a user remain displayed and the user has the option to work in any selected one of a series of sets of axes thus established.

In order to facilitate use of the system each set of axes can be displayed as a set of lines representing the orientation of each axis in the set and accompanying labels which identify each axis, the system being arranged such that selection of a label by cursor control enables rotation about the associated axis to be effected and selection of a line enables translational movement along the associated axis to be effected.

Furthermore, the system may be configured so as to enable the display of a locus representing the movement of the picture in three dimensional space and/or representing the movement of the origin of a user selected set of axes in three dimensional space. The video picture may comprise a sequence of video frames and the system can be arranged such that at least some of the frames can be defined by the user as key frames which are displayed at user defined position within the three dimensional movement. The locations of other frames in the sequence not having a user defined location can be calculated automatically by extrapolation between user defined keyframes. In this case the locations of keyframes in the movement are represented by first markers in the locus displayed on the display screen, and the locations of other frames are represented by second markers in the locus.

Thus according to another aspect of the invention there is provided a video processing system comprising frame storage means, data processing means, a viewing screen and user operable means arranged for cooperation with said processing means to effect manipulation of frame store data to simulate movement of a video image in three dimensional space, and wherein the system further comprises means for storing data defining the nature of said manipulations, means for determining address data representative of the positions of a predetermined element of a manipulated video image, and means for displaying connections between said positions to show the movements of said element.

Further features of the invention are as set forth in the appended claims and, together with those features above mentioned, will become clear from consideration of the detailed description of an exemplary embodiment of the invention which will be given in the following with reference to the accompanying drawings.

BRIEF DESCRIPTION OF THE DRAWINGS

FIG. 3 shows a locus representing movement of a point in the picture or the origin of a set of axes.

DESCRIPTION OF THE PREFERRED EMBODIMENT

Figure 1:
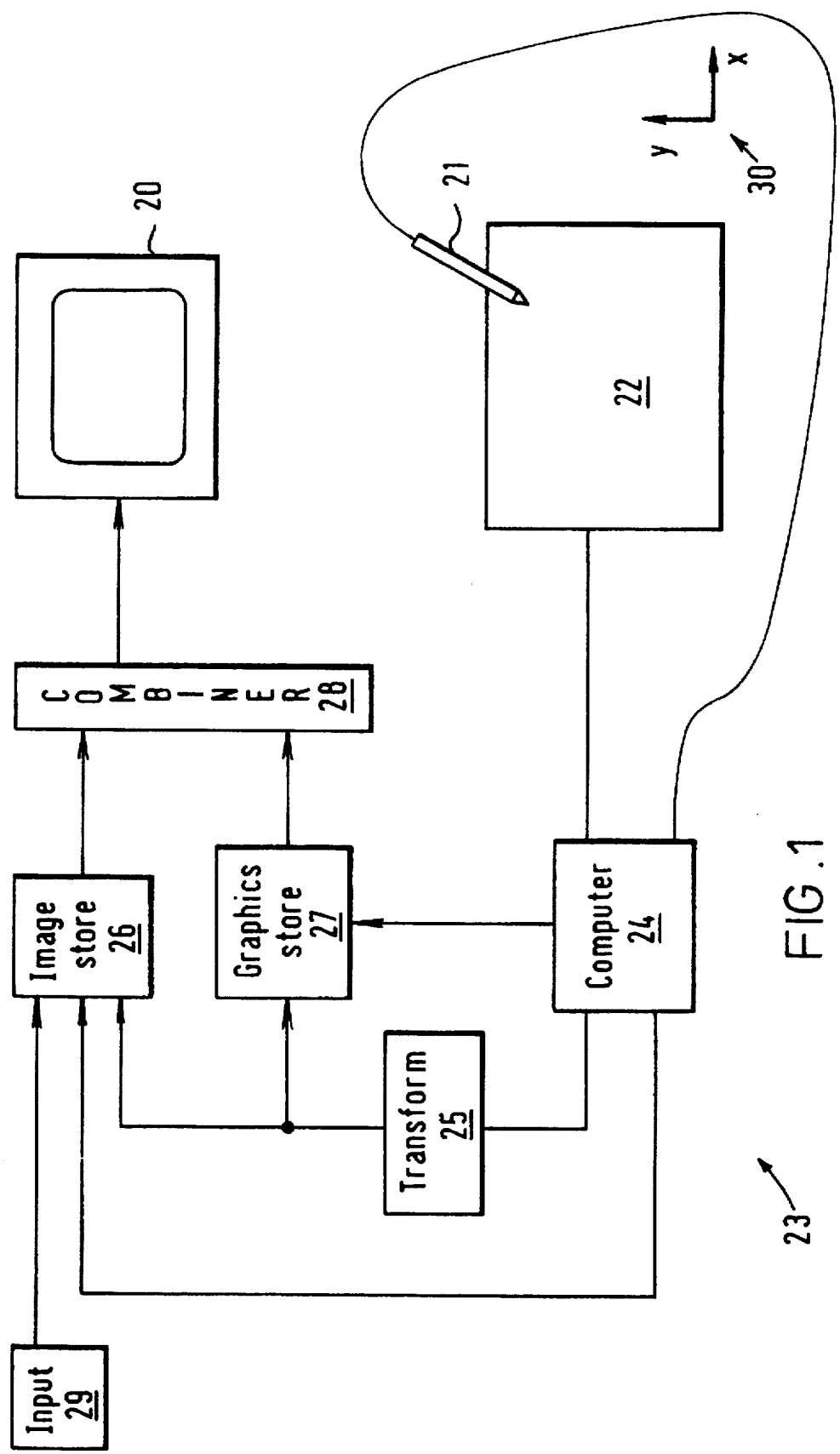
FIG. 1 shows a video processing system embodying the present invention.

A video processing system embodying the present invention is shown in FIG. 1 as comprising a television type monitor 20, a pressure sensitive stylus 21 and a touch tablet 22 each connected to a processing system 23. The processing system 23 includes a control computer 24, an address transforming circuit 25, an image framestore 26, a graphics framestore 27 and a video combiner 28. In operation an input signal is supplied by an input device 29 which for live video from a camera or an output from an analog video tape recorder will include an analog to digital converter. Alternatively the input may be in, say, D1 digital format, an approved digital standard for making digital video tape recordings from tape, disc or other digital processing system.

The processing system is arranged under software control 23 to enable video signals supplied thereto via the input device 29 to be manipulated frame by frame in real time to produce special rotational and translational effects by writing pixels to the image framestore 26 in a first order and reading them from the framestore 26 in a different order. Image manipulation systems which operate in this way are known and generally work as either read side systems, in which image data is written into a store in normal raster order and then read from the store for display in a different order, or write side systems, in which the order of the data is changed as it is written to the store and then is read conventionally. One example of a machine which writes to the store in normal raster order and then reads in a different order (read side) is manufactured by the present Assignee and sold under the trade mark "ENCORE" and is described in European Patent Publication No. EP-A-0283159 and in corresponding U.S. patent application Ser. No. 159780 and Japanese Patent Application No. Sho 63-62099 the disclosures whereof are incorporated herein by way of reference. Another machine which performs its manipulations while writing to a framestore and then reads in a conventional way (write side) is manufactured by the present Assignee and sold under the trade mark "MIRAGE" and is described in UK Patent Applications Nos. 2119594 and 2158671 the disclosures whereof are incorporated herein by way of reference. Write side processing is generally the more difficult, and the described embodiment of the present invention as represented in FIG. 1 is configured as a read side system though the invention could also be embodied in a write side system.

The system according to the present invention does not require the control panel having switch buttons and a tracker ball that are provided in our earlier ENCORE machine but instead is arranged under software control so that all operations can be effected by use of the pressure sensitive stylus 21 upon the touch tablet 22. More particularly, in the system of the present invention, a movement of the stylus 21 on the touch tablet causes the touch tablet to output address signals representing movements in x and y directions as shown by the axes 30 in FIG. 1. An additional parameter of the movement is defined by the pressure that is applied to the stylus as sensed by means of a pressure transducer incorporated into the stylus, for example by application of stylus pressure in an on/off fashion to define start and end points of an operation, e.g. the origin positions of successively established sets of axes. The stylus 21 and touch tablet 22 enable the user to control the movement of a cursor on the display screen and in this way a user is able to select an operation, effect it and store the result without looking away from the monitor 20. The vast number of picture movements achievable with a system of this type can be combined with previously known image processing features or options such as sizing, corner pinning etc selected from a menu displayed on the monitor.

Movement of the stylus swiftly across the edge of the touch tablet (a process known as swiping) is arranged in per se known manner to call up a menu of user selectable options which can be displayed anywhere in the screen, for example in the lower, or upper, quarter of the screen. The menu may obscure the display area below it or alternatively it may be made transparent. As the stylus is placed onto the touch tablet a cursor is displayed on the monitor and is controlled (moved) by moving the stylus on the touch tablet. An operation is selected by the user by moving the stylus so that the cursor appears over the appropriate menu item and then pressing the stylus onto the touch tablet so as to cause the pressure transducer to output a signal to indicate to the system the selection of the corresponding menu option. The system according to the present invention is therefore arranged by its software to be controlled in a very similar way to the video graphics system manufactured by the present Assignee and sold under the trade mark "PAINT-BOX".

Figure 2:
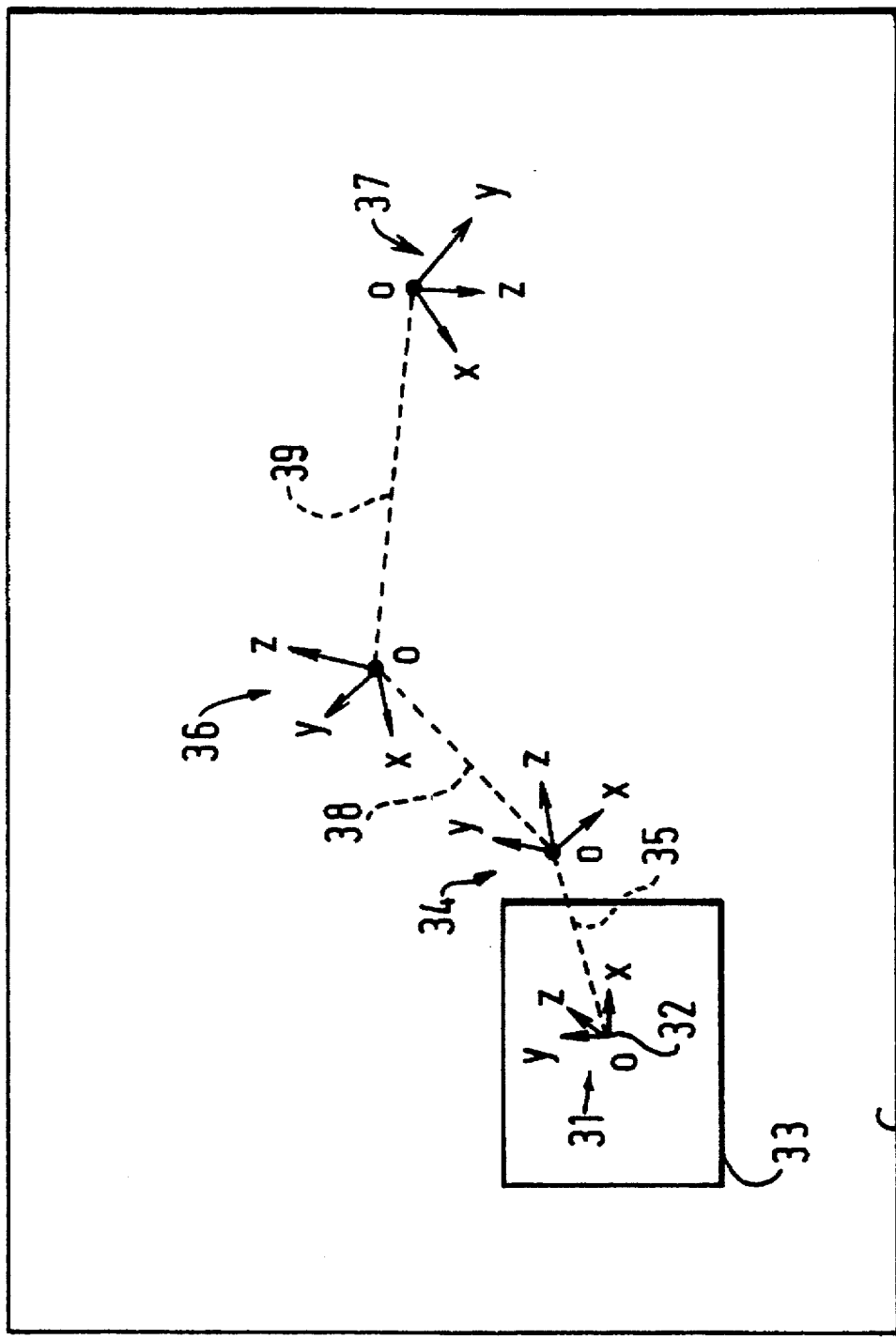
FIG. 2 shows an example of a typical display generated while using the system of FIG. 1.

As can be seen from the exemplary showing of FIG. 2 the image 33 read from store 26 has been reduced in size so that it occupies only part of the full screen of monitor 20. The system is arranged such that translational image movements can be controlled by operation of the stylus on the touch tablet so as to position the cursor over an x, y or z letter associated with a particular set of axes. With the cursor so positioned, pressing the stylus on the touch tablet (and thereby activating the pressure transducer therein) causes the respective axis to be selected and thus allows movement in the selected axis direction to be effected by further movement of the stylus. Similarly identifying an axis by placing the cursor over the line representing it and pressing the stylus to indicate selection allows rotation about that axis to be controlled by the user. Since the origin of the first set of axes 31 is always at the centre 32 of the picture, movement in relation to any point in 3D space other than in relation to the centre 32 of the picture requires the operator to ascend to a higher level, i.e. a different set of axes 34, 36, 37.

The on screen menu (not shown) provides for the selection of higher level axes. On selecting the second level, say, a second level reference point (origin) 34, with its accompanying set of axes oriented identically to the picture level axes 31, may be positioned anywhere on the screen by use of the stylus. By further use of the stylus in a manner as above described for the picture level axes 31 movements in this second set of axes can be effected. At this second level the user instructions define movements of the origin of the picture level axes 32 about the origin of the second level axes 34. Similarly, at the third level movements of the origin of the second level axes 34 are defined with respect to the origin of the third level axes 36, and at the fourth and in this case highest level movement of the origin of the third level axes 36 is defined with respect to the origin of the fourth level axes 37.

FIG. 2 shows the way in which picture movements may be controlled at different hierarchical levels by the use of a series of linked axes. On the display screen 20 a first set of axes 31 referred to hereinafter also as picture level axes, are automatically set up at the centre 32 of a picture 33 in response to user initiation of the system to enable the user selectively to rotate the picture with, or translate the picture in the direction of, any of the axes 31x, 31y, 31z, such rotation and/or translation being effected conventionally as hereinbefore described. Two of the axes 31x, 31y lie parallel to the x and y directions of the picture 33 and initially (before any picture rotation) of the display screen 20, and the third axis 31z is arranged to be perpendicular to the picture and thus initially (before any picture rotation) to the display screen 20. Each axis 31x, 31y, 31z is represented on the display screen by a line indicating the orientation of the axis and a letter x, y or z identifying the axis, and image manipulation is effected by operation of the stylus/touch tablet to move a cursor on the display screen and by means of the cursor to select either rotation or translation relative to a selected axis. Higher levels of axes may also be utilised.

A menu (not shown) that is provided on the display screen enables the user to select a higher level axes set, for example second level axes 34, and once selected the axes 34 can be located by use of the stylus and its pressure sensitive facility on the touch tablet at any point in three dimensional space and thereafter rotation and/or translation in the second axes level can be effected. The distance in three dimensional space between the origin 32 of the picture level axes 31 and the origin of the second level axes 34 is held fixed once it has been set by the user, and is represented by the broken line 35 in the drawing. Further higher levels of axes, for example third level axes 36 and fourth level axes 37, may also be defined at other points in three dimensional space if so required, the origins of such axes being held respectively at user defined fixed distances, represented in FIG. 2 by broken lines 38, 39, from the origins of the axes at the level below. Image manipulation by rotation and/or translation relative to any axis of the successive hierarchical levels of user defined axes is effected exactly as above described for the picture level axes.

The picture manipulation movements achievable by the present invention may be likened to the behaviour of a multiply articulated arm moving through three dimensional space. This notional articulated arm would have three links corresponding to the broken lines 35, 38 and 39 connected by ball joints at the origins of the axes 34 and 36 and with the centre 32 of the picture rotatably connected to the link 35 by a ball joint at the origin of axes 31 and the link 39 also connected to a ball joint at the origin of the axes 37. Since the articulated arm is merely notional, the links are such as to allow total movement of the picture 36 apparently in three dimensional space, including the situation of two links of the arm occupying the same space. The link system is set up by the system user who determines the initial positions of the ball joints 34, 36, 37 and the lengths of the links 35, 38, 39 and the user is then free to define movements of the picture by rotations and translations within the link system.

In order to facilitate operation of the system, each level of operation (i.e. each set of axes and associated graphics) advantageously has an associated color relating to that level so that movements in any given level are represented in its particular color. Thus the axes 31 for movement at the picture level are displayed in a picture level color, and the higher level axes 34, 36, 37 are displayed in different colors.

During the creation of a move, i.e. 3D movement of the picture, only a single picture frame 33 is read from the image store 26 and displayed on the monitor 20 and this picture frame 33 remains on the monitor's display whilst a move is being created. Video data for the or each set of axes 31, 34, 36, 37, and any other information to be displayed over the picture, for example the cursor, is stored in the graphics framestore 27 which is addressed in synchronism with the image store 26. However once the move has been defined, sequential frames of live video etc may be written to the store 26 via input device 29. The computer 24 includes a memory device for storing a sequence of manipulated read address signals representing the move. As the move progresses a narrow band of colour can usefully be arranged to move across the top of the screen to inform the operator how much memory space is available, and in this way all the information required by the operator is displayed on the monitor 20. The apparent three dimensional movement of the picture as defined by the operator is stored as a sequence of address signals defining how each frame of the video picture sequence will be manipulated to represent the movement. Movements are usually required to be smooth but not all addresses, either spatially or temporally, need to be stored, because intermediate addresses may be calculated by extrapolation. Thus in defining a movement only certain addresses for so-called "key" frames, i.e. image frames having a position actually defined by the operator, need to be stored and intermediate frames can be calculated by extrapolation between key frame addresses. Thus for example, a pendulum movement of the picture may be defined by movement along the X axis about a higher level reference point. The positions of maximum displacement in such a move may be defined as key frames and intermediate frames may be automatically calculated. The pendulum effect is then created by running the system and its speed is determined by the number of intermediate frames of the input picture sequence which are generated between key frames.

For a particular video production, and for future general reference, an operator may store a library of effects on a disc memory device which provides fast and substantially random access loading of data to the system's transforming circuit 25. Effects are difficult to describe and classify in a way which has any obvious meaning and therefore a particular previously defined effect will usually be arranged to be located by the user by previewing a number of effects from disc. The provision of the graphics store 27 also allows additional features to be provided which are not present in hitherto known systems. In accordance with another feature of this embodiment, the system may advantageously be arranged to display on the monitor address data in the form of a locus which shows the movement of a predetermined picture element over the duration of the effect. The locus, or string, represents the movement over time of the effect and thus may be previewed by the user to assist in the identification of a previously defined effect.

FIG. 3 of the accompanying drawings is an exemplary showing of the locus 40 of the centre point of the picture, i.e. the origin of axes 31, which constitutes in this example the abovementioned predetermined picture element. Locii be displayed representing movement of the origin of each set of axes in the corresponding colour associated with that level. The locus 40 thus may be displayed as indicated schematically in FIG. 3 as a series of segments 41 to 44 etcetera alternating in colour between the relevant level colour and another predetermined colour, say black. The points 45 to 49 at which segments meet represent the positions of frames of the video image, and the number of segments along the locus 40 represents the speed of the effect. A relatively large number of small segments will thus represent a slow effect, whereas a few large segments will represent a fast effect. The positions of key frames may be identified by markers such as the small lines 50 that are shown in FIG. 3 extending perpendicularly to the locus 40 at the relevant positions.

Locii are calculated using the same process that is used on each image picture point during the effect. As is known for example from our European Patent Application, Publication No. EP-A-0283159 aforementioned three dimensional movement of a picture which gives rise to new co-ordinates (x',y',z') in three dimensional space can be defined as a function of the original coordinates (x, y) in the two dimensional space of the monitor display. Once defined, the three dimensional coodinates are then projected onto the two dimensional plane of the monitor display screen and this gives new two dimensional co-ordinates (x", y") as functions of the three dimensional co-ordinates. The movement of the picture may therefore be defined as two functions defining the positions of x" and y" with respect to the original x and y coordinates. Thus x", y" coordinates are calculated for the centre of the image for each frame making up the effect.

Once a locus or string 40 has been calculated and displayed on the monitor 20, via graphics store 27, it can be put to other uses in addition to assisting identification of the nature of the effect. The system can be arranged so that the locus may be modified interactively by operation of the stylus 21 upon the touch tablet 22 with the modified coordinates then being fed to the computer 24 to define the position of new key frames. Once a new key frame position has been set, a line curving algorithm can be used to reposition other frames to maintain a smooth movement effect over time. As the cursor moves over a locus it jumps between the discrete frame positions 45 to 49 for example. A frame representing the shape of the picture at each frame position on the locus can also be displayed. Thus the shape of the locus in 3D space can be changed by moving the cursor to a point 45 to 49 and dragging the point to a new 3D position. A frame moved in this way need not be a key frame, it can instead be an intermediate frame, but it will become a key frame once it has been repositioned.

There has thus been described a video processing system for use in creating three dimensional movement of a video image on a display screen 20. At least one set of axes is displayed on the display screen and a computer 24, in response to signals from a user operated stylus 21 and touch tablet 22, controls the manipulation of image data in an image store 26 to control rotational or translational movement of the image, with respect to an axis selected by the user. In the described embodiment several sets of linked axes may be defined. Rotational and translational movement with respect to an axis is controlled respectively by selecting a marker identifying the axis or by selecting a line representing the axis. Selection is made by way of a cursor under the control of the stylus and touch tablet. The system can also display a locus representing the user defined movement of e.g. the centre of the image.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

I claim:

1. A video processing system for use in creating apparent three-dimensional movement of an entire video picture frame on a display, the system comprising:

a source of video signals representing a multiplicity of picture elements which together form said entire video picture frame;

a generating means for generating three-dimensional axes signals, representing at least one set of three-dimensional axes having a predetermined positional relationship to the video picture frame, for display with the video picture frame;

processing means for processing said video picture frame to effect three-dimensional transformations thereof;

combining means for combining the processed video picture frame and three-dimensional axes signals to produce a transformed video picture frame in combination with the at least one set of three-dimensional axes;

a display screen connected to said combining means for display of the transformed video picture frame; and user operable input means for selecting a marker identifying at least one axis of said at least one set of displayed axes by controlling the position of a cursor displayed on said display screen, said processing means effecting said three-dimensional transformations in response to said selection of said marker, the three-dimensional transformations causing apparent rotational movement of the displayed video picture frame about, or apparent translational movement of the displayed video picture frame in the direction of, or apparent rotational movement of the displayed video picture frame about and translational movement of the displayed video picture frame in the direction of said at least one axis identified by said marker.

2. A system as claimed in claim 1, in which the combining means comprises means for combining the axes signals representing said at least one set of three-dimensional axes with said video signals such that the combined signal represents the set of axes positioned at the center of the picture.

3. A system as claimed in claim 1 or 2, in which:
the generating means comprises means for generating axes signals representing a plurality of sets of three-dimensional axes; and
the system further comprises cursor generating means for generating cursor signals representing a cursor for display by the displaying means, the cursor signals representing the cursor at a position determined by user manipulation of the user operable input means, the cursor signals being combined into said combined processed video picture frame and three-dimensional axes signals by said combining means and the at least one set of axes being selectable by way of the displayed cursor.

4. A system as claimed in claim 3, further comprising means, responsive to user determined positions of the cursor displayed on the display screen, for defining a spatial relationship between each set of displayed three-dimensional axes.

5. A system as claimed in claim 3, in which the video signals represent a video picture comprising a sequence of video frames, the system comprising key frame defining means responsive to user manipulation of the user operable input means for defining at least some of the frames of said sequence as key frames and position defining means responsive to user manipulation of the user operable input means for defining positions in said apparent three-dimensional movement of the picture for display of the key frames at respective ones of said user defined positions.

6. A system as claimed in claim 5, including interpolating means for calculating by interpolation, between user defined key frames, positions of other frames in the sequence not having a user defined position.

7. A system as claimed in claim 1, in which the generating means comprises means for generating signals representing the at least one set of three-dimensional axes as a set of lines representing the orientation of each axis and a set of labels which identify each axis for use as said marker, the processing means being responsive to the selection of a label for effecting said rotational movement about the or each associated axis, and being responsive to the selection of a line for effecting said translational movement in the direction of the associated axis.

8. A system as claimed in claim 1, further comprising locus signal generating means for generating locus signals representing a locus depicting said apparent three-dimensional movement in respect of a predefined part of the picture or of said at least one set of three-dimensional axes, the locus signals being combined by said combining means into said combined processed video picture frame and three-dimensional axes signals.

9. A system as claimed in claim 8, in which the video signals represent a video picture comprising a sequence of video frames, the system comprising key frame defining means responsive to user manipulation of the user operable input means for defining at least some of the frames of said sequence as key frames and position defining means responsive to user manipulation of the user operable input means for defining positions in said apparent three-dimensional movement of the picture for display of said key frames at respective ones of said user defined positions, the locus signal generating means comprising means for generating locus signals in which the locations of key frames in the movement are represented by first markers in the locus and the locations of other frames are represented by second markers in the locus.

10. A method of simulating three-dimensional movement of an entire live video picture comprising:
providing video signals defining a multiplicity of picture elements which together form said entire live video picture frame and axes signals defining a set of axes having a selected positional relationship to said entire live video picture frame;
displaying both the picture frame and said set of axes;
generating a cursor to be displayed together with said picture frame and said axes;
using an operator controlled device to generate commands for movement of said entire picture frame either along at least one of said axes by controlling the position of the cursor to point to at least a part of at least one of said displayed axes and specifying movement therealong or about at least one of said axes by controlling the position of the cursor to point to at least a part of at least one of said displayed axes and specifying movement thereabout through the pointing process; and
spatially transforming the entire picture frame and the axes in accordance with said commands and displaying the spatially transformed picture frame and axes, whereby apparent three-dimensional movement is stimulated.

11. A method as in claim 10, in which the step of using an operator controlled device to generate commands for movement of said entire picture frame along or about at least one of said axes comprises pointing to at least one selected part of at least one of the displayed axes, said cursor being displayed together with said entire picture frame and said axes, and selectively manipulating the device to move the cursor along at least one displayed axis to command movement of the entire picture frame therealong or selectively manipulating the device to command a rotation of the entire picture frame about at least one displayed axis.

12. A method as in claim 11, in which the step of providing axes signals comprises providing signals defining a set of three-dimensional axes.

13. A method as in claim 12, wherein the video signals define a video picture comprising a sequence of video frames, and including the steps of using the operator controlled device to define selected frames of the sequence as key frames and to define selected positions of said key frames in said apparent three-dimensional movement of the picture.

14. A method as in claim 13, including the step of interpolating parameters of frames in the sequence which are intermediate said key frames from information pertaining to the key frames.

15. A method as in claim 14, including the step of generating locus signals representing a locus depicting the simulated three-dimensional movement of a selected part of the picture or of at least one set of three-dimensional axes, and displaying said locus.

16. A method as in claim 10, wherein the video signals define a video picture comprising a sequence of video frames, and including the steps of using the operator controlled device to define selected frames of the sequence as key frames and to define selected positions of said key frames in said apparent three-dimensional movement of the picture.

17. A method as in claim 10, including the step of generating locus signals representing a locus depicting the simulated three-dimensional movement of a selected part of the picture or of at least one set of three-dimensional axes, and displaying said locus.

* * * * *